Oct. 13, 1970   H. B. CLARK ETAL   3,533,734
PURIFYING CRUDE TiCl₄ VAPOR
Filed May 9, 1968
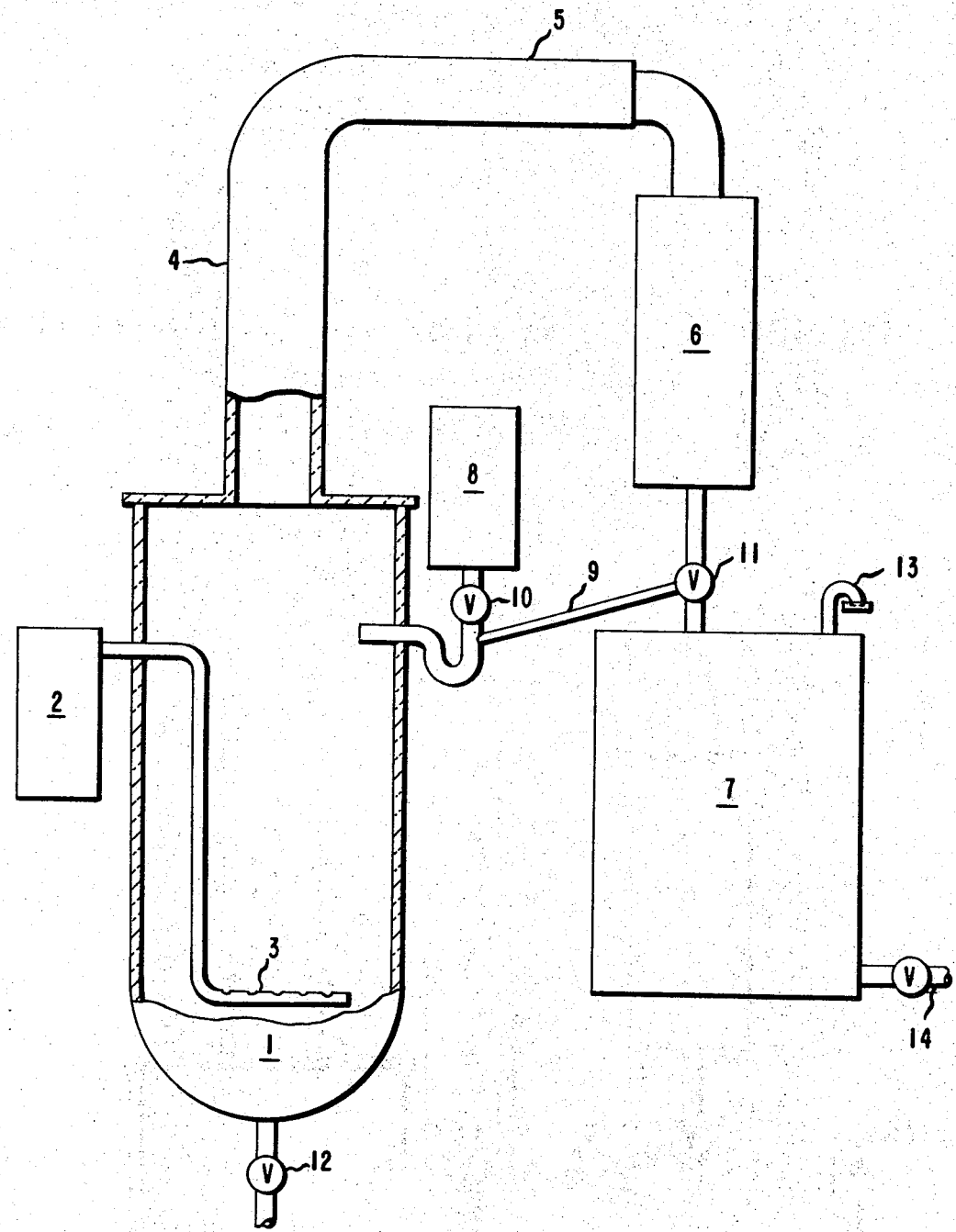
INVENTORS
HAROLD B. CLARK
KENNETH M. KOLB
BY Carl A. Hechmer
ATTORNEY 3,533,734
PURIFYING CRUDE TiCl₄ VAPOR
Harold B. Clark and Kenneth M. Kolb, Wilmington, Del., assignors to E. I. du Pont de Nemours and Company, Wilmington, Del., a corporation of Delaware
Continuation-in-part of application Ser. No. 635,009, May 1, 1967, which is a continuation-in-part of Ser. No. 426,059, Jan. 18, 1965. This application May 9, 1968, Ser. No. 727,794
Int. Cl. C01g 23/02
U.S. Cl. 23—87    3 Claims

ABSTRACT OF THE DISCLOSURE

Titanium tetrachloride, containing vanadium as an impurity, is purified by passing impure tetrachloride in the vapor state through a column of an organic treating agent in the liquid state. The liquid-vapor contact is made at the liquid-vapor equilibrium temperature. The equilibrium temperature is established and maintained in the contacting zone by heat derived from the impure tetrachloride vapor. The heat content of the vapor, including superheat, preferably is regulated depending on the temperature and relative quantity of incoming liquid phase providing the column and the heat loss characteristics of the contacting apparatus, so that condensation of titanium tetrachloride vapor or evaporation from the treating liquid is minimized. The vanadium in the impure tetrachloride vapor is fixed as a non-volatile residue by the agent and pure tetrachloride vapor is then separated from the liquid phase and recovered.

CROSS REFERENCES

This application is a continuation-in-part of pending application S.N. 635,009 filed May 1, 1967, now abandoned, which in turn is a continuation-in-part of S.N. 426,059, now abandoned, filed Jan. 18, 1965.

BACKGROUND OF THE INVENTION

Titanium tetrachloride is a useful intermediate employed in various processes demanding high purity, as in the manufacture of titanium metal, titanium dioxide pigments, and other titanium compounds. Prior to such employment, the titanium tetrachloride must be subjected to purification treatment to free it of impurities carried over into the product during its manufacture. Thus, in preparing the compound through chlorination in the presence of a carbonaceous reducing agent of titanium-bearing materials such as ilmenite and rutile ores, or waste slag from ilmenite iron recovery operations, the crude TiCl₄ usually has a deep yellow color due to the presence of other chlorides, particularly of iron and vanadium carried over during the chlorination of the titanium values. In the usual chlorination, the finely ground ore is mixed with a powdered carbonaceous reducing agent, such as coke and is chlorinated, either in a fluidized bed or in a fixed bed of briquettes at temperatures between 500 and 1400° C. and usually in the range of from 800° C. to 1100° C.

The hot gases from the chlorination consisting of mixtures of TiCl₄ with chlorides of the other metals mentioned are cooled and purified in accordance with known procedures to effect iron chloride, aluminum chloride and other high boiling chloride removal. After removal of the high boiling solid chlorides, condensation of the TiCl₄ is undertaken in conventional water-cooled or contact condensers. The crude liquid TiCl₄ produced from such condensation must be subjected to a further purification for removal of objectionable high boiling residual chlorides as well as the near and low boiling chlorides of vanadium, silicon, tin, arsenic and sulfur. Of these, vanadium is especially deleterious if present during TiO₂ pigment manufacture and is one of the most difficult of impurities to remove from TiCl₄. Normally, this impurity is present to the extent of 200 to 4000 parts per million. To be useful in TiO₂ pigment production, the TiCl₄ intermediate must contain less than 10 parts per million vanadium and, preferably, should contain less than 5 parts per million.

Distillation is a preferred prior art technique for purification since TiCl₄ boils at about 136.4° C. at atmospheric pressure. Impurities such as iron chlorides and aluminum oxychlorides having much higher boiling points than TiCl₄ can be easily removed by this technique. Since vanadium is normally present as VOCl₃ or VCl₄, both of which boil at about the same temperature as TiCl₄, distillation without use of other aids is not a practical method of purification. Previously, vanadium impurity removal has been effected by converting the impurity to a relatively non-volatile form by means of organic treating agents which react with the VOCl₃ or VCl₄ to form non-volatile complex vanadium derivatives. Organic materials utilized for this purpose include animal and vegetable oils, e.g., tall oil, and waxes, and hydrolyzed and saponified derivatives, such as fatty acids, fatty alcohols and soaps, petroleum fractions, such as lubricating oil, mineral oil and heavy residual fractions, such as Bunker "C" oil; predominantly hydrocarbon manufactured materials, and predominantly hydrocarbon polymers such as polyethylene and polypropylene. In such treatment the organic reagent or mixture is incorporated into the crude TiCl₄ liquid and the resulting solution is added to the heat exchanger vaporizer for distillation.

Unfortunately, the organic metal-complexing agents mentioned above, tend to polymerize at elevated temperatures in the presence of TiCl₄, especially when the other contaminating metals are present. This polymerization occurs to a large extent on the hot surfaces employed to boil the TiCl₄ in the still. As a result, the polymer sludge adheres to and fouls such heating surfaces, reducing the heat transfer capacity and in relatively short periods expensive equipment outage for cleaning and repair is required.

SUMMARY OF THE DISCLOSURE

In accordance with the present invention, vanadium and other undesirable impurities in crude TiCl₅ are readily and effectively removed and equipment fouling prevented, by passing the contaminated TiCl₄ while in the vapor state through a solution (or finely divided suspension in the liquid state) of an organic treating agent having an affinity for vanadium, while avoiding the use of heating surfaces in contact with the liquid-treating agent in the contacting zone. Thereafter, the purified TiCl₄ product is condensed and recovered as a liquid.

In a more specific and preferred embodiment, vanadium contaminant is removed from crude TiCl₄ by scrubbing vaporous, crude TiCl₄ by passage of the crude vapor through a column of a solution of $TiCl_4$ containing from 0.03 to 10% by weight of soap maintained at the vapor-liquid equilibrium temperature by means of heat derived from the crude $TiCl_4$ vapor. Thereafter, the vaporous, vanadium-free $TiCl_4$ is condensed and the pure, liquid $TiCl_4$ product is recovered.

In the practice of this invention, a liquid form of the treating agent is prepared, preferably by mixing the agent with liquid $TiCl_4$, either pure or crude. This liquid is then used for intimate contact as described above, with hot crude titanium tetrachloride vapor either in a batch or continuous manner. Superheat may be supplied to the vapor so that the contacting zone is raised to and maintained at the vapor-liquid equilibrium during the vapor purification procedure. The degree of superheat, the temperature of the liquid phase and the quantities of material involved are controlled so that the liquid phase does not disappear from the contacting zone. Replenishment of the treating agent is made as it is consumed by reaction with the impurities. In the continuous operation the treating agent solution is preferably fed to the contacting zone at temperatures between about 90° C. and the operating equilibrium temperature. The liquid is preferably brought to this temperature range either by using hot tetrachloride for making up the preparation or by sparging the mixture with hot titanium tetrachloride vapor, superheated if desired. The hot titanium tetrachloride vapors may be obtained directly from a source such as a chlorination furnace or from a partial condenser wherein iron chloride is separated. In either case the vapor can be above its boiling point. The desired heat content of the vapor may also be obtained by either liquid or gas phase superheaters, preferably the former, in which the crude tetrachloride is heated by known heat exchange means without difficulty since the organic treating agent is not present. The organic treating agents used are well known, but when the heating of their solutions is accomplished solely by the introduction of hot vapors, the problem of fouled surfaces is overcome.

DESCRIPTION OF THE DRAWING

Referring particularly to the drawing, insulated treatment vessel 1, receives vapor of crude $TiCl_4$ from the crude $TiCl_4$ source 2, through sparge nozzle 3. The vapors, after passing through a column of liquid (not shown) provided in treatment vessel 1, pass through insulated separating column 4, and by means of insulated conduit 5, into condenser 6, which feeds the purified liquid into product storage 7. The liquid in treatment vessel 1, through which the crude vapors pass, is a mixture of liquid $TiCl_4$ (either crude or purified) and a treating agent. The treating agent is added to the system from treating agent source 8 as required. Line 9 provides means for feeding purified $TiCl_4$ liquid to treatment vessel 1 as required. Preferably the liquid in vessel 1 is hot; in any event, heat is supplied to it by the hot crude vapors which are passed through it in the process. Control valves 10 and 11 are used, respectively, to direct treating agent and liquid $TiCl_4$ to treatment vessel 1 when a supply of these materials is desired. The spent sludge, containing the vanadium impurity, is periodically or continuously drained from vessel 1 by means of control valve 12. Storage tank 7 is vented to the atmosphere through cap vent 13 and is equipped with valving means 14 to facilitate product removal. Source 2 may be a vaporizer and super heater or it may simply convey the crude vapor from a chlorination operation at some temperature above the boiling point, e.g. between 140° C. and 250° C. This vapor is supplied under sufficient pressure to force it through nozzle 3. As the vapor rises through the liquid in vessel 1 the contact with the agent removes or fixes the vanadium impurity and the pure vapor rises through column 4 and then passes through conduit 5 into condenser 6 and product storage 7. In order to help maintain sufficient liquid in tank 1 to achieve effective contact, (e.g., a column height of ½ to 3 feet) valve 11 may be used to return liquid $TiCl_4$ to tank 1. Spent sludge containing the vanadium loaded agent may be removed at drain valve 12 and replaced by fresh agent. If desired, column 4 may contain baffles or other devices to prevent carrying entrained liquid over to the condenser. A packed or other type column providing good vapor-liquid contact is suitable. Liquid $TiCl_4$ may be supplied to this column to wash the vapor. Such liquid may be provided by a partial condensor at the top of the column or by pumping some of the product to the column. This device is not part of the invention but merely serves to protect the product from contamination.

The method of making vapor-liquid contact in treatment tank 1 may be varied. For example, mechanical agitation to disperse the vapor in the liquid may be employed.

Conventional type equipment can be employed in the process of the present invention. Thus the system may include, in combination, a dissolving tank or other solids-liquid contacting vessel equipped with an agitator or stirrer, a vaporizer or other source of hot crude $TiCl_4$ vapor, a condenser and a collector or storage vessel. The purification of the crude vapor is carried out in gas-liquid contacting devices, those having liquid as the continuous phase with the vapor rising in dispersed bubbles; a liquid phase superheater operating under pressure can be used to provide superheat as a source of hot crude $TiCl_4$ vapor, a chlorination furnace, an iron chloride condenser, a vapor heater, or a reboiler fitted with vapor heating elements to provide super-heat is satisfactory. If the $TiCl_4$ source is a liquid it can be heated and flashed as superheated liquid $TiCl_4$ through a suitable valve or nozzle into the contacting zone. Thus, as illustrated, a liquid absorbing solution can be prepared in the mix tank by mixing at ambient temperature a suitable liquid, such as relatively pure titanium tetrachloride or a relatively high boiling organic material, such as a chlorinated hydrocarbon (dichlorobenzene, chlorotoluene, chloronaphthalene, etc.) with sufficient organic treating agent to react completely in the presence of an excess of said liquid with the $VOCl_3$ or $VCl_4$ impurity present in the crude $TiCl_4$ subjected to treatment with the absorbing solution. Usually the amount of organic treating agent or mixture employed ranges from about .05 to 5% by weight but if desired such amount may range up to 10% by weight. Preferably, the organic treating agent used comprises dry, powdered laundry soap or similar soap product resulting from the saponification or neutralization of fats, oils, waxes, rosins or their acids, with an organic or inorganic base. Particularly adapted for use are the sodium salts of hydrolyzed naturally-occurring fatty acid triglycerides, and the alkali metal salts of such fatty acids as stearic, oleic, palmitic, e.g., sodium stearate, potassium oleate, sodium palmitate, etc. Alternatively, various polymers, such as polyethylene, and various vegetable and mineral oils, such as cotton seed or tall oil, lubricating oil and Bunker "C" oil can be utilized.

EXAMPLE 1

This example is illustrative of a series of absorption treatments which were undertaken to determine the extent of vanadium removal obtained under varying conditions of the invention. Columns or deep pools of organic-titanium tetrachloride mixtures were prepared by mixing weighed amounts of commercially available soap flakes (alkali metal stearates) into 100 and 200 milliliter portions of pure $TiCl_4$ contained in tubes approximately 1¼" in diameter and 1 ft. in length. To such soap-$TiCl_4$ liquid mixture, a crude vanadium-containing $TiCl_4$ vapor was introduced via a 4 millimeter glass tube submerged to about ½" above the bottom of the sparge column. The temperature of the liquid was maintained by a constant boiling mixture enclosing the tubes and the $TiCl_4$ vapor was passed through the soap-$TiCl_4$ liquid in depths of 3 to 6 inches as shown. During such vapor passage the scrubbing liquid was maintained at the boiling point of $TiCl_4$. After the scrubbing operation, the $TiCl_4$ vapor was collected and analyzed for vanadium. Particular details and results of these runs are given in the following table.

TABLE I

| No. | Feed vapor | | Treating agent | | Depth, in. | Initial temperature | | Time, min. | Product | |
|---|---|---|---|---|---|---|---|---|---|---|
| | P.p.m. V | Ml./min.[1] | G./l. | Ml. | | Liquid, °C. | Vapor, °C. | | P.p.m. V | Color |
| 1 | 2,000 | 1.3 | 30 | 200 | 6 | 136 | 136 | 30 | 5 | Water white. |
| 2 | 600 | 3.0 | 100 | 200 | 6 | 136 | 136 | 125 | 5 | Do. |
| 3 | 600 | 2.9 | 2 | 200 | 6 | 136 | 350 | 30 | 6 | Do. |
| 4 | 600 | 3.0 | 3 | 100 | 3 | 125 | 380 | 30 | 4 | Do. |
| 5 | 600 | 3.0 | 2 | 100 | 3 | 136 | 370 | 27 | 5 | Do. |

[1] Measured as liquid feed.

EXAMPLE II

This illustrates a working adaptation of the test shown in Example I. Using the equipment of the drawing with a 10 gallon treatment tank 1 and with an insulation covering tank riser and pipe as far as the condenser, the treatment tank is loaded with about 6 gallons of $TiCl_4$ by introducing crude vapor from a partial condenser in which iron chloride is separated from the crude $TiCl_4$. The condenser 6 is operated and all the condensate is returned to tank 1 by proper setting of valve 11. When tank 1 is loaded with liquid $TiCl_4$ it will be at the vapor liquid equilibrium temperature due to passage of the hot vapor. At this point 0.02 gal. of a 10% solution of a stearate soap in $TiCl_4$ is admitted to tank 1. After a few minutes elapse to clean the condenser of the crude $TiCl_4$, valve 11 is turned to send all the product to product storage 7. The liquid level in tank 1 is maintained more or less constant by manipulating valve 11 to raise the level, or, by closing 11, evaporation in tank 1 due to super heat in the crude vapor will lower the level. By sampling the condensate and checking the vanadium content it can be determined when the agent is becoming exhausted. At this time fresh agent is added, and an equal volume drained at valve 12. By this means the vanadium level can be maintained below a specified level down to about 4 p.p.m.

In general, use is contemplated of various, known organic treating agents or mixtures which react with and remove vanadium compounds such as $VOCl_3$ or $VCl_4$ from $TiCl_4$. Soap employment and treatment is especially preferred, particularly the alkali metal salts of high molecular weight fatty acids such as those of stearic, myristic, palmitic, oleaic and lauric acids, or mixtures obtained by reacting an alkali metal hydroxide with an animal or vegetable fat. As noted above, use is contemplated of a wide variety of organic treating agents, or mixtures, in addition to soap. These include mineral oil, polyethylene, tall oil, vegetable oil, etc. which are suitable as complexing agents for the undesired vanadium compound impurity. These can be generally classified as fats, esters, modified fats, resins, polymers, tars, carbonyls, petroleum oils, chlorinated hydrocarbons, paraffins, petroleum residues and the like. These materials are effective in concentrations of from 0.03 to 10% weight in the scrubbing liquid. The structural feature necessary in the molecules of useful organic treating agents is chains of —$(CH_2)$— groups. Those containing at least 5

—$(CH_2)$—$(CH_2)$— groups per molecule are preferred for use. Such compounds including linear and branched-chained aliphatic hydrocarbons, whether saturated, unsaturated or polyunsaturated, fatty acids, fatty alcohols and their derivatives, and polyolefins. These agents are already known in this field and the foregoing description of them may be understood as defining the term "organic treating agent."

If desired, the liquid contacting solution can be heated to near the boiling point, for example about 130° C. prior to contact with crude vapor. The impure vapor under treatment will then come into contact with the liquid and establish thermal equilibrium with a minimum of condensation. Use is made of the heat content of the incoming impure vapor to bring the mixture to the equilibrium temperature and the temperature and quantity of the vapor and the liquid are adjusted accordingly to provide the desired thermal balance at the equilibrium temperature. Scrubbed liquids may be used for treatment of the vapor until its capacity for vanadium absorption becomes exhausted, whereupon it is replaced by a fresh treating slurry. Continuous operations can be undertaken where a fraction of the treating solution is bled off to a holding tank and replaced by a like amount of fresh soap solution at the treating vessel.

The present invention provides a novel and effective method for purifying vaporous $TiCl_4$ to remove impurities present predominantly in the form of vanadium oxychloride and tetrachloride. Advantageously it eliminates the fouling of the surfaces of purification vessels with sludges containing vanadium-organic polymerization products, and avoids the handling problems which the presence of such sludges entails and provides a continuous method for removing vanadium containing organic sludges from the operating equipment.

The heat content of the impure vapor is available for heating the reaction mixture in several ways. It may be present as true superheat which is transferred to the liquid on contact. The heat available from the vapor as it expands due to decreasing pressure will suffice; its heat of condensation may also be employed wherein the condensation of a relatively very small amount of vapor will raise the liquid temperature several degrees. In the last two instances it is preferable to feed the liquid treating agent into the reactor hot so that the equilibrium temperature may be reached and maintained with a minimum of vapor condensation.

An outstanding improvement afforded by the present invention is the elimination of heating surfaces in contact with a vanadium-containing sludge. By scrubbing vanadium compounds from titanium tetrachloride vapor in the manner herein contemplated, one circumvents and precludes the heating of vanadium sludge-containing liquids by means of solid heating elements which in turn fouls heat transfer surfaces and to an extent such that the equipment becomes a poor conductor of heat to require shutdown for cleaning.

In addition, process economics are improved since the use of expensive inorganic purifying reagents is dispensed with. Organic material advantageously provides a large number of compounds which can be chosen for use. Hence, this improved operation based upon use of organic purifying agents is most preferred because of the flexibility it enjoys with respect to the availability and cost of these agents.

Most previously known purification methods are directed toward removing vanadium from crude $TiCl_4$ which is relatively pure in the sense that the majority of the impurities has already been removed through the condensation and distillation steps. Furthermore, the vanadium treatment has always been carried out in a separate step in the production of titanium tetrachloride. This separate step involves the condensation of $TiCl_4$ vapor from the first rectification step, the liquid phase treatment with agents and a second revaporization. Since the removal of vanadium from the initial crude vapor stream is afforded herein by eliminating condenser and revaporization steps, considerable savings on investment as well as operating costs can result.

Many equivalent modifications of this invention will become apparent to those skilled in the art from a reading of the above without a departure from the inventive concept.

We claim:

1. In a process for removing vanadium impurities from impure titanium tetrachloride in which said impure titanium tetrachloride is vaporized and brought into contact at the vapor-liquid equilibruim temperature with a mixture of an organic purifying agent, reactive with said vanadium impurity, in liquid titanum tetrachlorde and the purified vapor is recovered from said mixture, the improvement comprising providing the impure vapor with sufficient controlled heat content to maintain said mixture in the liquid state and at the liquid-vapor equilibrium temperature without the use of other heating means, whereby fouling of any heat transfer surfaces is prevented.

2. The process of claim 1 wherein the said vapor is supplied with super-heat to establish and maintain the said equilibrium temperature.

3. The process of claim 1 wherein the said organic treating agent is soap.

References Cited

UNITED STATES PATENTS

| | | |
|---|---|---|
| 2,224,061 | 12/1940 | Pechukas. |
| 2,412,349 | 12/1946 | Meyers. |
| 2,592,021 | 4/1952 | Frey et al. |
| 2,614,028 | 10/1952 | Schaumann. |
| 3,102,785 | 9/1963 | Bristow. |
| 3,156,630 | 11/1964 | Fahnoe et al. |

EDWARD STERN, Primary Examiner

U.S. Cl. X.R.

23—312